United States Patent [19]

Ikeda et al.

[11] Patent Number: 5,446,657
[45] Date of Patent: Aug. 29, 1995

[54] STEERING STABILITY CONTROL SYSTEM FOR VEHICLE

[75] Inventors: Tooru Ikeda; Naoki Ohmomo; Hironobu Kiryu; Takashi Nishihara; Shuji Shiraishi, all of Wako, Japan

[73] Assignee: Honda Giken Kogyo Kabushiki Kaisha, Tokyo, Japan

[21] Appl. No.: 15,173

[22] Filed: Feb. 11, 1993

[30] Foreign Application Priority Data

Feb. 14, 1992 [JP] Japan .................................. 4-028271

[51] Int. Cl.$^6$ .......................... B60K 26/00; B62D 6/00
[52] U.S. Cl. ............................ 364/424.05; 364/426.01; 180/79; 180/197
[58] Field of Search .................. 364/424.01, 424.05, 364/426.01, 426.02, 426.03; 180/79, 79.1, 132, 140, 141, 142, 143, 282, 197; 280/840, 707, DIG. 1

[56] References Cited

U.S. PATENT DOCUMENTS

| | | | |
|---|---|---|---|
| 4,704,541 | 11/1987 | Leiber | 180/142 X |
| 4,840,389 | 6/1989 | Kawabe et al. | 364/424.05 X |
| 5,001,636 | 3/1991 | Shiraishi et al. | 364/424.05 |
| 5,078,226 | 1/1992 | Inagaki et al. | 180/141 |
| 5,177,681 | 1/1993 | Sato | 364/424.05 |
| 5,258,912 | 11/1993 | Ghoneim et al. | 364/424.05 |
| 5,276,620 | 1/1994 | Bottesch | 364/424.05 |
| 5,276,624 | 1/1994 | Ito et al. | 364/424.05 |
| 5,379,222 | 1/1995 | Anan et al. | 364/426.03 |

FOREIGN PATENT DOCUMENTS

| | | |
|---|---|---|
| 0282041 | 9/1988 | European Pat. Off. |
| 0461570A2 | 12/1991 | European Pat. Off. |
| 0488052A2 | 6/1992 | European Pat. Off. |
| 4001347A1 | 7/1990 | Germany |
| 4008704A1 | 9/1991 | Germany |
| 4201146A1 | 7/1992 | Germany |

Primary Examiner—Kevin J. Teska
Assistant Examiner—Collin W. Park
Attorney, Agent, or Firm—Armstrong, Westerman, Hattori, McLeland & Naughton

[57] ABSTRACT

A steering stability control system for a vehicle includes a turning state judging device for judging turning state of the vehicle to output an oversteering signal or an understeering signal, and a steering stability control device for controlling an output torque from an engine on the basis of an output from the turning state judging device. This system further includes a counter-steering judging device capable of judging a counter-steering state of the vehicle and causing the turning state judging device to output an oversteering signal when the counter-steering state is judged. Thus, it is possible to reliably judge the oversteering and the understeering during turning of the vehicle.

4 Claims, 6 Drawing Sheets

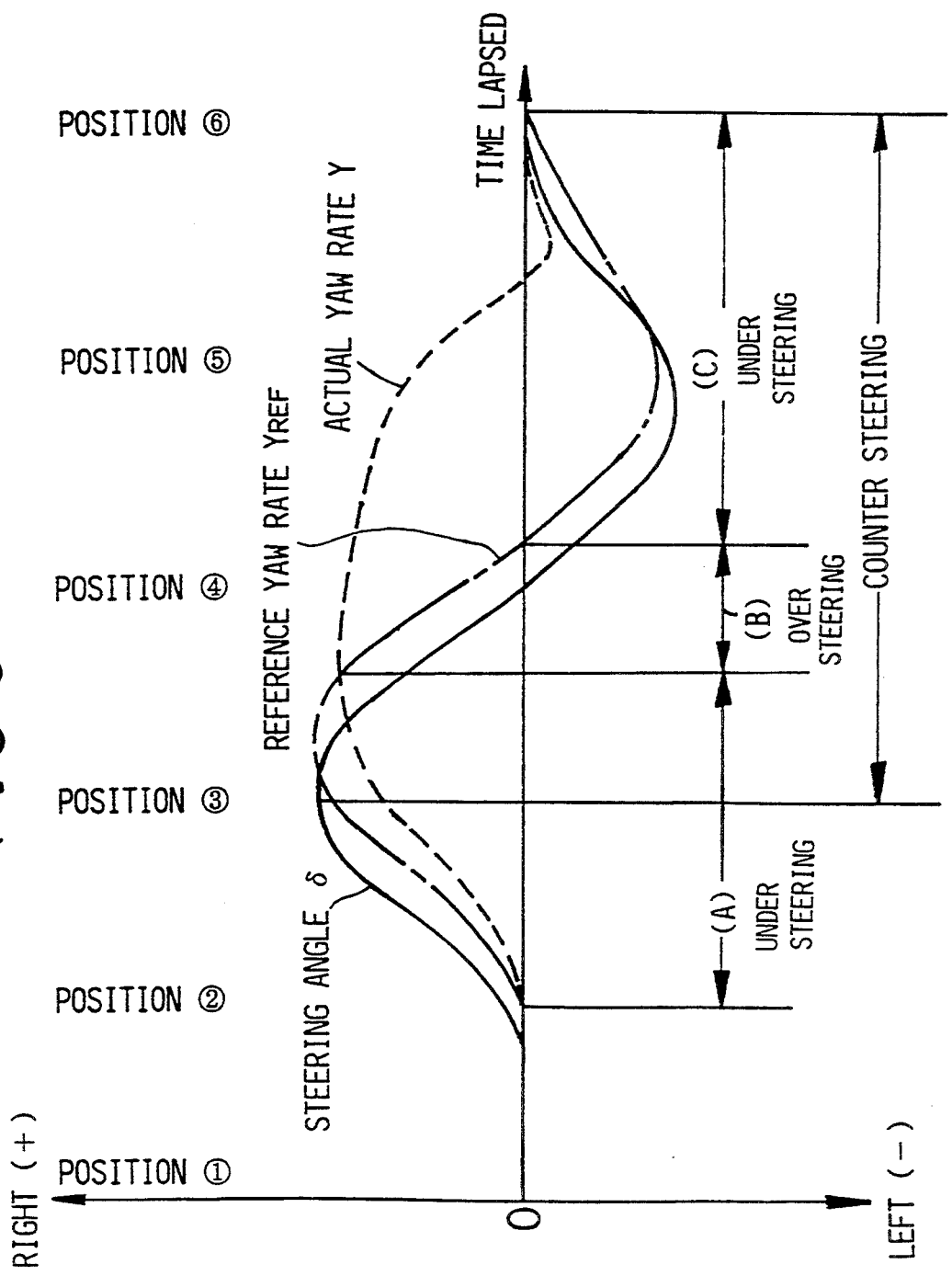

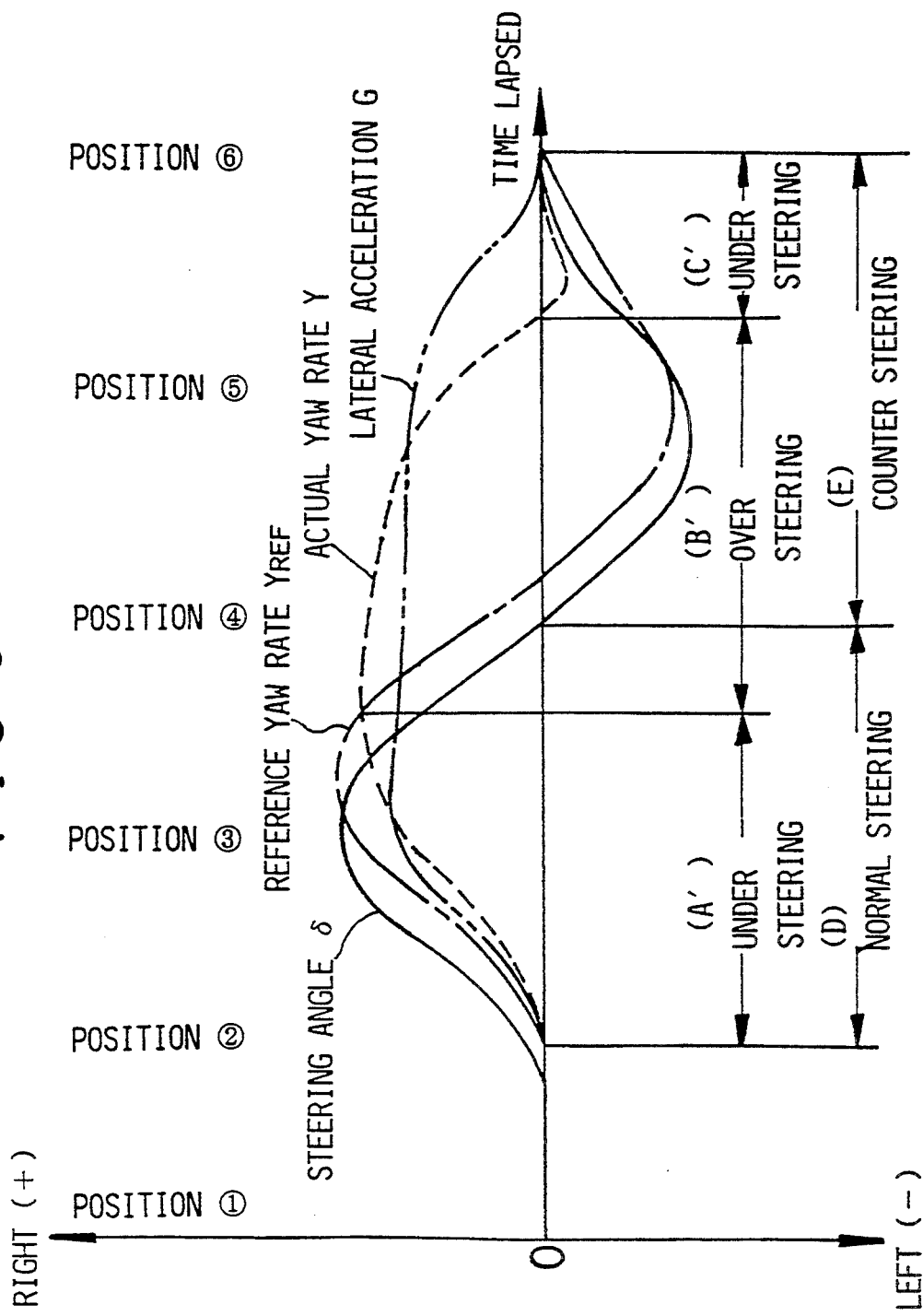

STEERING STABILITY CONTROL SYSTEM FOR VEHICLE

BACKGROUND OF THE INVENTION

1. Field of the Invention

The present invention relates to a steering stability control system for a vehicle, comprising a turning state judging means for judging the turning state of the vehicle to deliver an oversteering signal or an understeering signal, and a steering stability control means for controlling the output torque from an engine on the basis of the output from the turning state judging means.

2. Description of the Related Art

There is a conventionally known steering stability control system for a vehicle, which is designed such that a reference yaw rate to be intrinsically generated by the vehicle in accordance With the operational condition of the vehicle is compared with an actual yaw rate actually generated; the turning state of the vehicle is judged, i.e., it is judged whether the vehicle is in an oversteering or in an understeering, and the output torque from the engine is increased or reduced in accordance with the judged turning state, thereby compensating for the oversteering and the understeering to properly maintain the steering stability of the vehicle.

This steering stability control system will be described below with reference to FIGS. 4 and 5. For example, it is considered that the vehicle is turned in a clockwise direction through a path (1) to (6), as shown in FIG. 4. FIG. 5 illustrates the variations in steering angle δ of a steering wheel, reference yaw rate $Y_{REF}$ and actual yaw rate Y. Suppose that when a driver of the vehicle steers the steering wheel in a clockwise direction (which is referred to as a positive direction herein), so that the vehicle is turned in the clockwise direction through a path (1) to (3), an oversteering tendency is produced, causing the vehicle to run inwardly in the turning direction. The driver counter-steers the steering wheel in a counterclockwise direction (which is referred to as a negative direction herein) from a position indicated by (3) for the purpose of maintaining the turning radius constant. This causes the steering angle δ to become 0 (zero) at a position indicated by (4) and further to become the negative maximum value at a position indicated by (5). At a position (6) in which the turning is completed, the steering angle δ becomes 0 (zero) again. At that time, the reference yaw rate $Y_{REF}$ determined on the steering angle δ follows the variation in steering angle δ with a slight delay due to an influence of a play of a steering system or the like. The actual yaw rate Y which is an actual yaw rate of the vehicle does not immediately follow the counter-steering operation due to an inertia of the vehicle and is maintained positive with the exception of the last stage of the turning.

Table 1 illustrates the criterion for prior art judgement of an oversteering and an understeering of the vehicle. The positive and negative of the reference yaw rate $Y_{REF}$ (the axis of ordinates) are compared with the positive and negative of a deviation Y—$Y_{REF}$ (the axis of abscissas) resulting from subtraction of the reference yaw rate $Y_{REF}$ from the actual yaw rate Y, and the oversteering and the understeering can be judged by a combination of these positives and negatives.

TABLE I

| Reference yaw rate | Actual yaw rate-ref. yaw rate | |
|---|---|---|
| | non-negative | negative |
| non-negative: | oversteering | understeering |
| negative: | understeering | oversteering |

If Table 1 is applied to a graph shown in FIG. 5, in a region (A) of regions (A) and (B) in which the reference yaw rate $Y_{REF}$ is non-negative, the deivation Y—$Y_{REF}$ resulting from subtraction of the reference yaw rate $Y_{REF}$ from the actual yaw gate Y is negative. Therefore, the region (A) corresponds to a right and upper column, and in the region (A), it is judged that the vehicle is in the understeering. On the other hand, in the region (B), the deviation Y—$Y_{REF}$ resulting from substraction of the reference yaw rate $Y_{REF}$ from the actual yaw rate Y is non-negative. Therefore, the region (B) corresponds to a left and upper column, and in the region (B), it is judged that the vehicle is in the oversteering. In a region (C), the reference yaw rate $Y_{REF}$ is negative and the deviation Y—$Y_{REF}$ resulting from subtraction of the reference yaw rate $Y_{REF}$ from the actual yaw rate Y is non-negative. Therefore, the region (C) corresponds to a left and lower column, and in the region (C), it is judged that the vehicle is in the understeering.

If it is judged that the vehicle is in the oversteering or the understeering, the output torque from the engine in the front wheel drive vehicle can be increased or reduced, thereby avoiding the turning of the vehicle in an undesirable direction.

With the above-described prior art technique for judging the oversteering and understeering, however, it is misjudged in the region (C) in FIG. 5 that the vehicle is in the understeering, notwithstanding that the counter-steering is conducted, because the vehicle shows an oversteering tendency. Thus, the output torque from the engine should be intrinsically increased, but a control is performed so that the output torque from the engine is reduced inversely.

SUMMARY OF THE INVENTION

Accordingly, it is an object of the present invention to provide a steering stability control system for a vehicle, wherein when the vehicle is brought into a counter-steering state, a mistake can be prevented from being produced in the judgement of the oversteering and the understeering.

To achieve the above object, according to a first aspect and feature of the present invention, there is provided a steering stability control system for a vehicle, comprising a turning state judging means for judging a turning state of the vehicle to output an oversteering signal or an understeering signal, and a steering stability control means for controlling an output torque from an engine on the basis of an output from the turning state judging means, wherein said system further includes a counter-steering judging means capable of judging the counter-steering state of the vehicle and causing the turning state judging means to output an oversteering signal, when the counter-steering state is judged.

With the first feature of the present invention, in the counter-steering state in which the direction of a lateral acceleration of the vehicle does not coincide with the direction of a steering angle, the accident or inadvertent delivery of an understeering signal by the turning state judging means can be prevented, and an intrinsic oversteering signal can be delivered. Therefore, it is possible to correctly operate the steering stability control means to previously avoid a disadvantage that the vehicle is turned in an undesirable direction.

In addition, to the first feature, the present invention has a second aspect and feature that the turning state judging means judges the turning state on the basis of a deviation of an actual yaw rate of the vehicle from a reference yaw rate of the vehicle.

With the second feature of the present invention, the turning state judging means can reliably judge the oversteering state and the understeering state of the vehicle.

In addition to the first feature, the present invention has a third aspect and feature that the counter-steering judging means judges a counter-steering state on the basis of a steering angle and a lateral acceleration of the vehicle.

With the third feature of the present invention, the counter-steering judging means can reliably judge the counter-steering state of the vehicle.

The above and other objects, features and advantages of the invention will become apparent from the following description of one preferred embodiment, taken in conjunction with the accompanying drawings.

FIG. 5 is a graph illustrating the prior art turning state judging technique; and FIG. 6 is a graph illustrating a turning state judging technique according to the present invention.

DESCRIPTION OF THE PREFERRED EMBODIMENTS

The present invention will now be described by way of a preferred embodiment in connection with the accompanying drawings.

Figure 1:
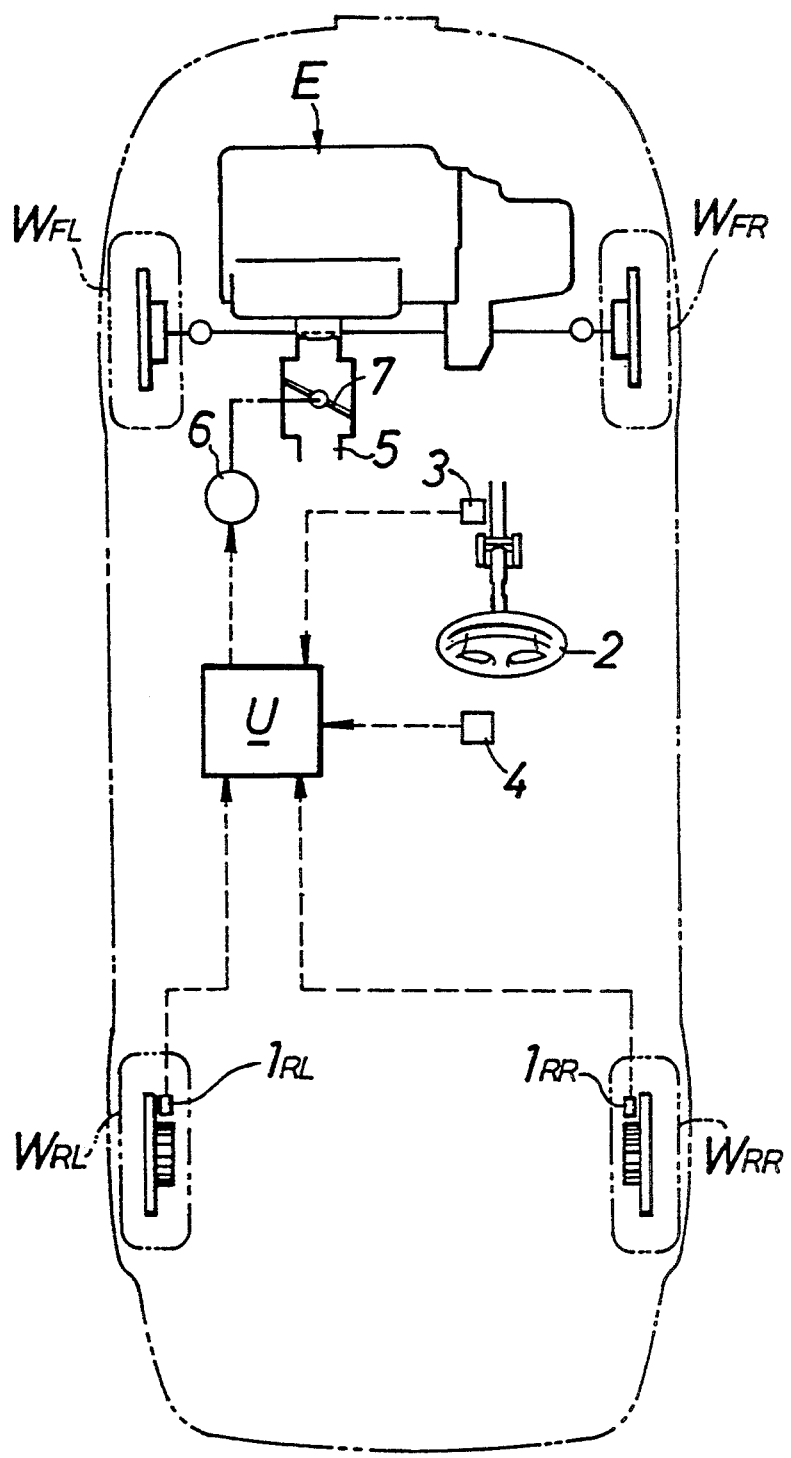
FIG. 1 is a schematic diagram of the construction of a vehicle equipped with a steering stability control system according to a preferred embodiment of the present invention.

Referring to FIG. 1, a vehicle to which the present invention is applied is a front wheel drive vehicle and comprises a pair of left and right driven wheels $W_{FL}$ and $W_{FR}$ driven by an engine E, and a pair of left and right follower wheels $W_{RL}$ and $W_{RR}$. A pair of left and right follower wheel speed detecting means $1_{RL}$ and $1_{RR}$ are provided on the follower wheels $W_{RL}$ and $W_{RR}$ for detecting follower wheel speeds $V_{RL}$ and $V_{RR}$, respectively.

A steering angle detecting means 3 is provided on a steering wheel detector 2 for detecting a steering angle $\delta$, and a lateral acceleration detecting means 4 is mounted in place on a vehicle body for detecting a lateral acceleration G. A throttle valve 7 is mounted in an intake passage 5 of the engine E and connected to and opened and closed by a pulse motor 6. The follower wheel speed detecting means $1_{RL}$ and $1_{RR}$, the steering angle detecting means 3, the lateral acceleration-detecting means 4 and the pulse motor 6 are connected to an electronic control unit U comprising a microcomputer.

Figure 2:
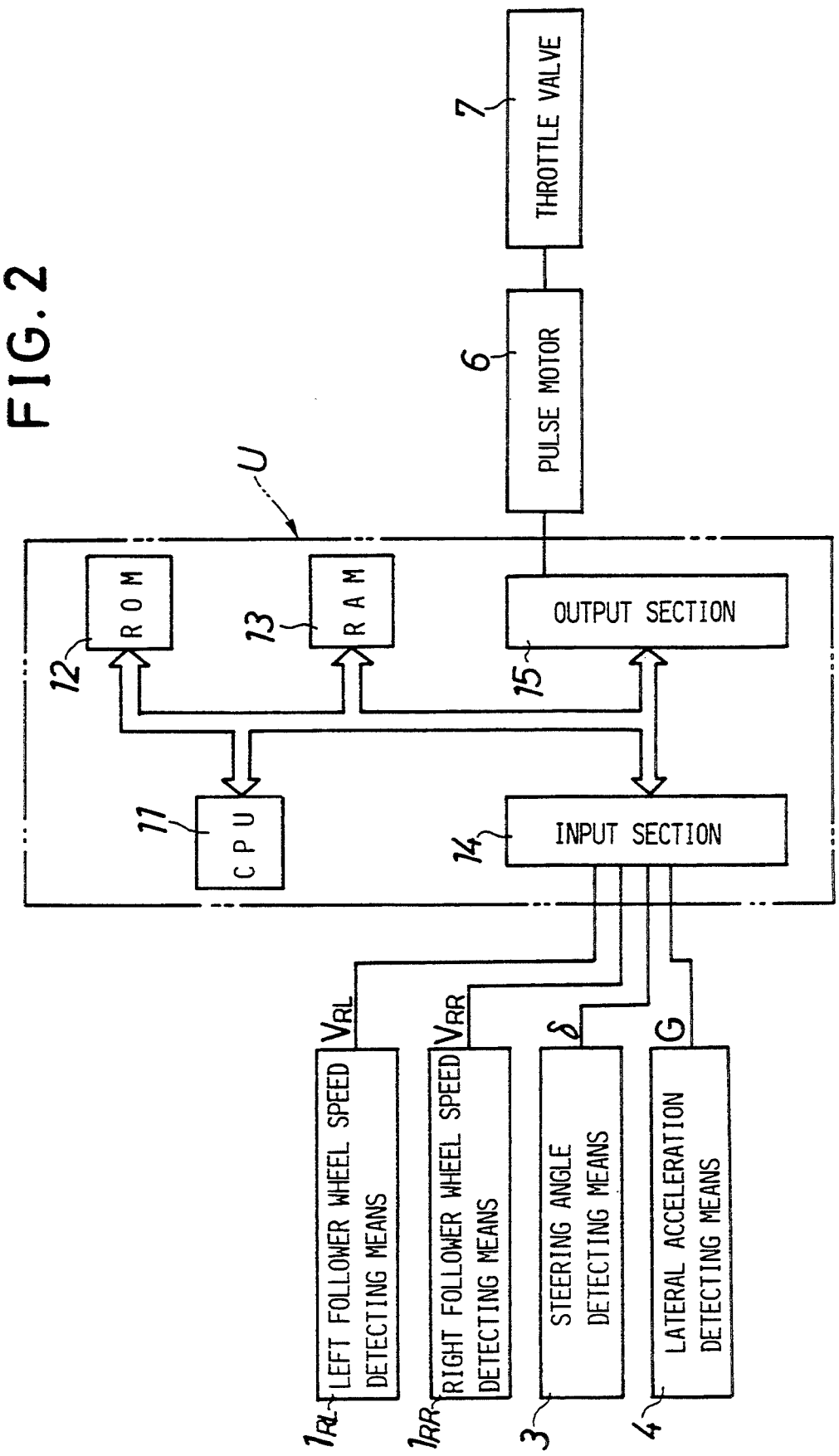
FIG. 2 is a block diagram of the steering stability control system.

FIG. 2 illustrates the electronic control unit U for controlling the output torque from the engine E by calculating signals from the various detecting means according to a controlling program and driving the throttle valve 7 by the pulse motor 6, so as to maintain the steering stability during turning of the vehicle. The electronic control unit U is comprised of a central processing unit (CPU) 11 for performing such calculation; a read only memory (ROM) 12 having the controlling program and various data such as tables stored therein; a random access memory (RAM) 13 for temporarily storing the output signals from the detecting means and the calculation results; an input section 14 to which the various detecting means, i.e., the follower wheel speed detecting means $1_{RL}$ and $1_{RR}$, the steering angle detecting means 3 and the lateral acceleration detecting means 4 are connected; and an output section 15 to which the pulse motor 6 is connected. The electronic control unit U calculates the various signals inputted thereinto through the input section 14, the data stored in the read only memory 12 and the like in the central processing unit 11 on the basis of the controlling program which will be described hereinafter, and finally drives the pulse motor 6 through the output section 15. This causes the throttle valve 7 to be controlled to vary the output torque from the engine E and as a result, the torque of the driven wheels is controlled to an optimal value to prevent the vehicle from being turned in an undesirable direction.

The circuit arrangement of the electronic control unit U will be described below with reference to FIG. 3.

The left and right follower wheel speeds $V_{RL}$ and $V_{RR}$ detected by the left and right follower wheel speed detecting means $1_{RL}$ and $1_{RR}$ are inputted into an actual yaw rate calculating means 21, where an actual yaw rate Y of the vehicle is determined by multiplying a difference ($V_{RL} - V_{RR}$) between the follower wheel speeds $V_{RL}$ and $V_{RR}$ by a predetermined constant corresponding to a tread of each of the left and right follower wheels $W_{RL}$ and $W_{RR}$.

The left and right follower wheel speeds $V_{RL}$ and $V_{RR}$ are inputted into a vehicle speed calculating means 22, where a vehicle speed $V_V$ of the vehicle is determined by calculating an average $(V_{RL} + V_{RR})/2$ of the follower wheel speeds $V_{RL}$ and $V_{RR}$. The vehicle speed $V_V$ and a steering angle $\delta$ detected by the steering angle detecting means 3 are inputted into a reference yaw rate calculating means 23, where a reference yaw rate $Y_{REF}$ is determined. The reference yaw rate $Y_{REF}$ is a reference value as a standard of a yaw rate to be generated when a driver of the vehicle has steered the steering wheel 2 through a steering angle $\delta$ at the current vehicle speed $V_V$, and is used as a criterion in judging the turning state of the vehicle, i.e., an oversteering and an understeering.

The actual yaw rate Y and the reference yaw rate $Y_{REF}$ are inputted into a turning state judging means 24, where it is judged whether the vehicle is in an oversteering state or an understeering state. If a value during clockwise turning of the vehicle is positive, the turning state judging means 24 compares the positive and negative of the actual yaw rate Y with the positive and negative of a deviation $Y - Y_{REF}$ resulting from subtraction of the reference yaw rate $Y_{REF}$ from the actual yaw rate Y, and judges the oversteering and the understeering by a combination of these positives and negatives, as shown in Table 2, and also judges the degree of each of the oversteering and the understeering by an absolute value of the deviation $Y - Y_{REF}$. As is apparent from comparison of Tables 1 and 2, Tables 1 and 2 are different from each other in that the reference yaw rate $Y_{REF}$ in the axis of ordinates in Table 1 is replaced by the actual yaw rate Y in Table 2.

TABLE 2

| Actual yaw rate | Actual yaw rate-ref. yaw rate | |
|---|---|---|
| | non-negative | negative |
| non-negative: | oversteering | understeering |
| negative: | understeering | oversteering |

Figure 4:
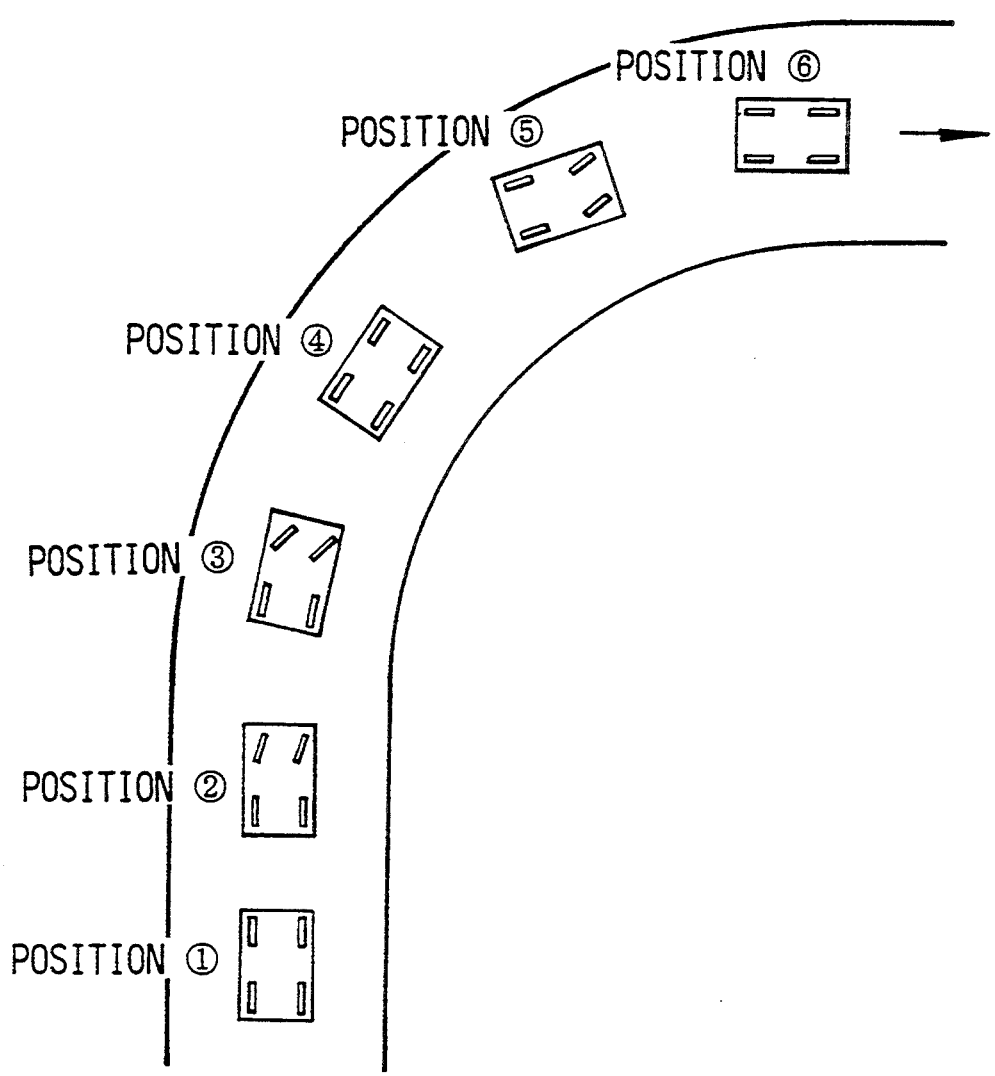
FIG. 4 is a diagram for explaining the turning state of the vehicle.

If the turning state of the vehicle as shown in FIG. 4 is judged on the basis of Table 2 and FIG. 6, a region (A') and a region (C') are understeering regions, and a region (B') is an oversteering region. If this is compared with the turning state in the prior art shown in FIG. 5, the region (C') misjudged as being the understeering region is reduced as compared with a region (C) in the prior art, leading to an improved judging accuracy. However, the misjudgment may be still performed in the region (C') even by the above-described technique and hence, according to the present invention, the following judgement is further carried out in a counter-steering judging means 26.

Figure 3:
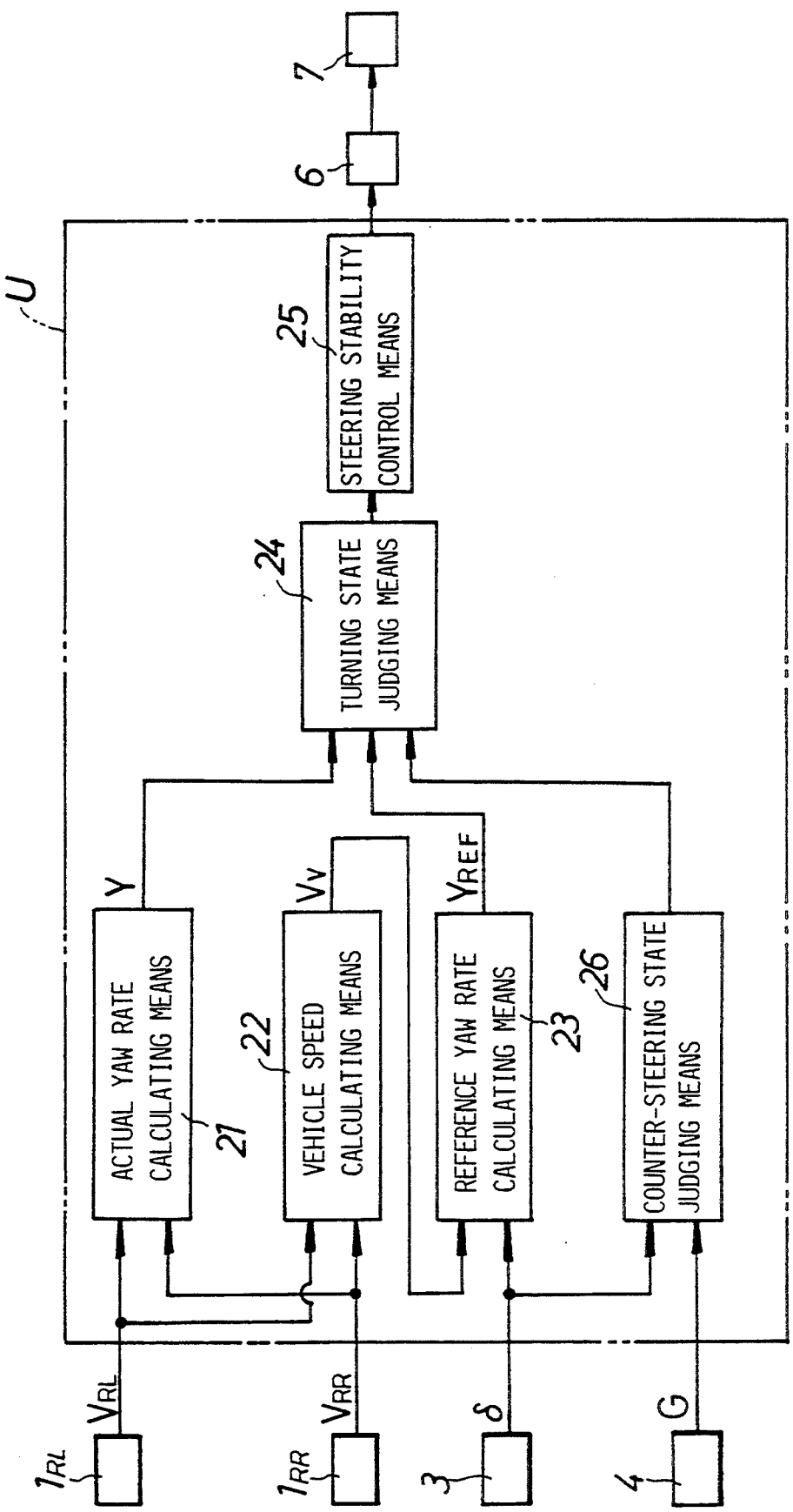
FIG. 3 is a block diagram illustrating a circuit arrangement of an electronic control unit.

As shown in FIG. 3, the positive and negative of the lateral acceleration G detected by the lateral acceleration detecting means 4 is compared with the positive and negative of the steering angle δ detected by the steering angle detecting means 3, thereby judging whether the vehicle is in a normal-steering or in a counter-steering. If it has been decided that the vehicle is in the counter-steering, the vehicle is considered to be in the oversteering, irrespective of the result of judgement in Table 2.

TABLE 3

| Lateral acceleration G | Steering angle δ | |
|---|---|---|
| | non-negative | negative |
| non-negative: | normal-steering | counter-steering |
| negative: | counter-steering | normal-steering |

This will be described below with reference to FIG. 6. In a region (D), the lateral acceleration G converted into the steering angle δ is positive, and the steering angle δ is positive, and hence, the region (D) is a normal-steering region in correspondence to a left and upper column in Table 3. In a region (E), the lateral acceleration G is positive and the steering angle δ is negative, and hence, the region (E) is a counter-steering region in correspondence to a right and upper column in Table 3. in the region (E) decided as being the counter-steering region, the vehicle is considered to be in the oversteering state, irrespective of the result of judgement in Table 2. Therefore, the region (C') in which it should be intrinsically misjudged that the vehicle is in the understeering can correctly be judged as being a region in which the vehicle is in the oversteering.

When the vehicle is in the normal steering, the turning state judging means 24 delivers an oversteering signal or an understeering signal on the basis of the outputs from the actual yaw rate calculating means 21 and the reference yaw rate calculating means 23, i.e., on the basis of Table 2. When it is decided on the basis of Table 3 that the vehicle is in the counter-steering, the turning state judging means 24 delivers the oversteering signal irrespective of the outputs from the actual yaw rate calculating means 21 and the reference yaw rate calculating means 23.

When the oversteering signal is inputted from the turning state judging means 24 into a steering stability control means 25, the latter opens the throttle valve 7 through the pulse motor 6 to increase the output torque from the engine E. If the output torque from the engine E in the front wheel drive vehicle is increased, the oversteering is corrected toward the understeering, because the vehicle has an understeering tendency, thereby preventing the vehicle from being turned in an undesirable direction. Inversely, if the vehicle is in the understeering and the understeering signal is supplied from the turning state judging means 24 into the steering stability control means 25, the latter closes the throttle valve 7 through the pulse motor 6 to reduce the output torque from the engine E. If the output torque from the engine E in the front wheel drive vehicle is reduced, the understeering is corrected toward the oversteering, because the vehicle has an oversteering tendency, thereby preventing the vehicle from being turned in an undesirable direction.

Although the embodiment of the present invention has been described in detail, it will be understood that the present invention is not intended to be limited to the embodiment, and various minor modifications can be made without departing from the spirit and scope of the invention defined in claims.

For example, although the vehicle having the front wheels as the driven wheels and the rear wheels as the follower wheels has been illustrated in the embodiment, the present invention is also applicable to a rear wheel drive vehicle having front wheels as follower wheels and rear wheels as driven wheels. In this case, if the counter-steering of the vehicle is judged, the output torque from the engine is controlled to be reduced, in contrast with in the above-described embodiment.

What is claimed is:

1. A steering stability control system for a vehicle having an engine, comprising a turning state judging means for judging a turning state of the vehicle and outputting either an oversteering signal or an understeering signal based on said turning state of the vehicle, and a steering stability control means for controlling an output torque from said engine on the basis of an output from said turning state judging means, wherein said system further includes a counter-steering judging means for judging a counter-steering state of the vehicle and causing said turning state judging means to output said oversteering signal for controlling the output torque from the engine according to said oversteering signal when said counter-steering state is judged.

2. A steering stability control system for a vehicle according to claim 1, wherein said turning state judging means judges the turning state on the basis of a deviation of an actual yaw rate of the vehicle from a reference yaw rate of the vehicle.

3. A steering stability control system for a vehicle according to claim 1, wherein said counter-steering judging means judges a counter-steering state on the basis of a steering angle and a lateral acceleration of the vehicle.

4. A steering stability control system for a vehicle having an engine, comprising a turning state judging means for judging a turning state of the vehicle and outputting either an oversteering signal or an understeering signal based on said turning state of the vehicle, and a steering stability control means for controlling a driven wheel torque on the basis of an output from said turning state judging means, wherein said system further includes a counter-steering judging means for judging a counter-steering state of the vehicle and causing said turning state judging means to output said oversteering signal for controlling the driven wheel torque according to said oversteering signal when said counter-steering state is judged.

* * * * *